T. M. CASS.
SEED COTTON CLEANER.
APPLICATION FILED JAN. 31, 1916.
1,209,114.
Patented Dec. 19, 1916.
2 SHEETS—SHEET 1.
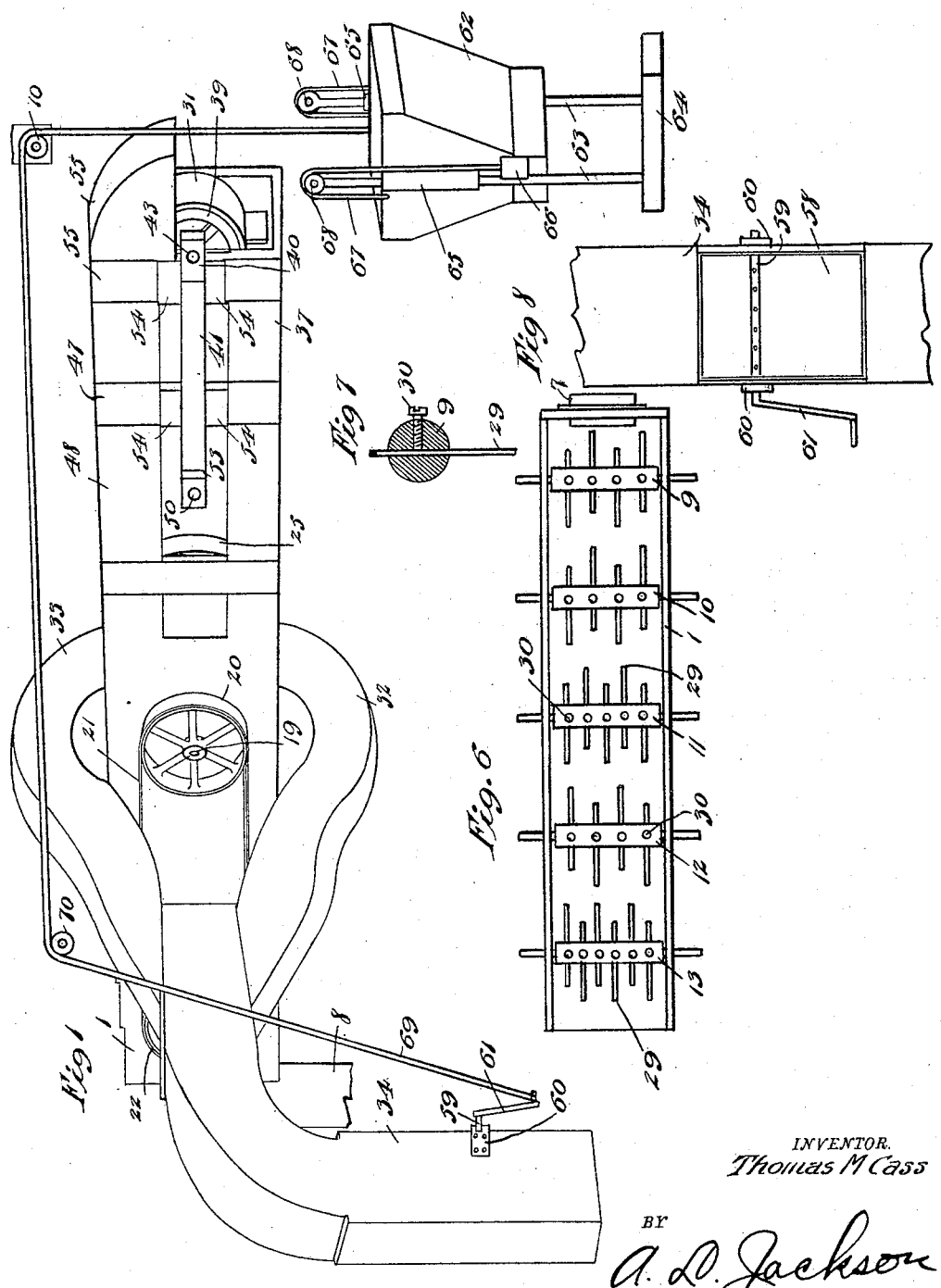
INVENTOR.
Thomas M Cass
BY
A. D. Jackson
ATTORNEY.

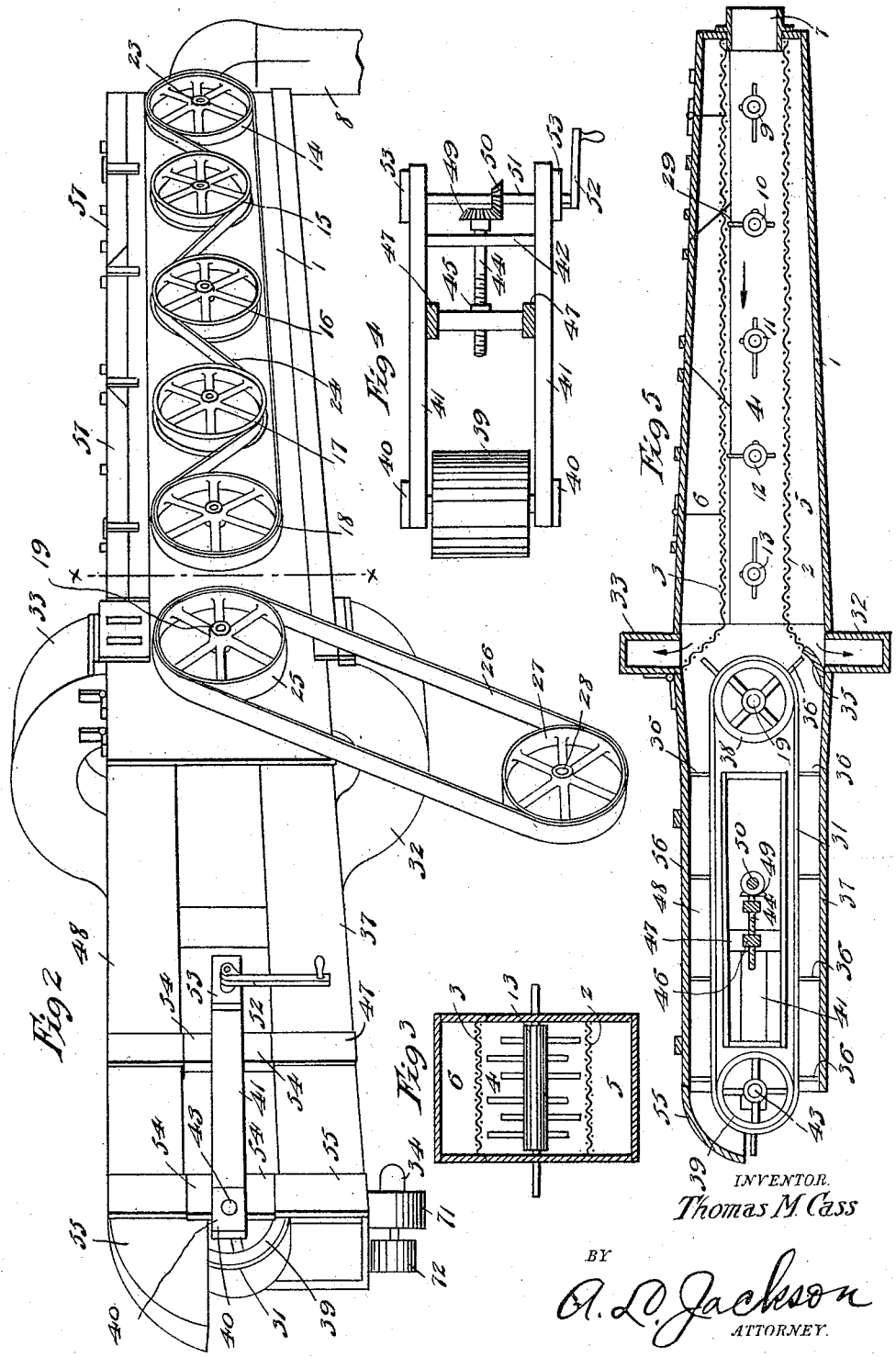

UNITED STATES PATENT OFFICE.

THOMAS M. CASS, OF TYLER, TEXAS.

SEED-COTTON CLEANER.

1,209,114.　　　　　Specification of Letters Patent.　　Patented Dec. 19, 1916.

Application filed January 31, 1916. Serial No. 75,278.

*To all whom it may concern:*

Be it known that I, THOMAS M. CASS, a citizen of the United States, residing at Tyler, in the county of Smith and State of Texas, have invented certain new and useful Improvements in Seed-Cotton Cleaners, of which the following is a specification.

My invention relates to seed cotton cleaners and more particularly to machines for cleaning seed cotton in preparation for supplying the seed cotton to the gin elevators and distributers, and the object is to provide a machine which is highly efficient in cleaning all trash and dirt out of the cotton before it is delivered to elevators for distribution to the gins, and to provide mechanism which will systematically clean the cotton without breaking the fiber, and to provide the mechanism with attachments which will render the adjustment of all the parts feasible and practical, and to provide an automatic control for stopping the cotton or checking the amount of cotton which is fed to prevent overflow of the receptacle which is provided for receiving the cleaned cotton.

Other objects and advantages will be fully explained in the following description and the invention will be more particularly pointed out in the claims.

Reference is had to the accompanying drawings which form a part of this application.

Figure 1 is a perspective view of the complete cotton cleaner. Fig. 2 is a perspective view of the cotton cleaner, taken on the opposite side from the view shown in Fig. 1. Fig. 3 is a vertical cross-section, taken on the line $x$—$x$ of Fig. 2, on a reduced scale. Fig. 4 is a detail view of the mechanism for adjusting the tension of the discharge conveyer. Fig. 5 is a longitudinal vertical section of the cleaning and discharge numbers, showing the interior mechanism. Fig. 6 is a plan view of the cleaning chamber with the top removed and the cleaning reels shown diagrammatically in order to show the number and arrangement of the beaters,—the correct relative positions of the reels having been shown in Fig. 5. Fig. 7 is an enlarged cross-section of one reel, showing the manner of securing the beaters in the reels. Fig. 8 is a broken view of the discharge chute, showing the arrangement of the automatic valve for controlling the supply of cotton to the cleaner.

Similar characters of reference are used to indicate the same parts throughout the several views.

This machine is provided with a cleaning chamber 1 which is divided into compartments by screens 2 and 3, forming a cotton cleaning compartment 4 and compartments 5 and 6 for escape of air to carry trash and dirt. The screens 2 and 3 may be of ordinary wire mesh. An air pipe connection 7 is provided for a chute 8 which is to take up the cotton from a wagon or other supply source. The cotton moves along in the chamber 4 and is agitated by the reels 9, 10, 11, 12, and 13 which are driven respectively by pulley wheels 14, 15, 16, 17, and 18 which may be driven from the shaft 19 by means of a pulley 20, belt 21, and pulley 22 which drives shaft 23, the wheels 14 to 18 inclusive being driven by a single belt 24. The shaft 19 may be driven by the pulley 25, belt 26, and pulley 27 which may be driven by any suitable line shaft 28. The reels are provided with beaters 29 which are secured in the drums by passing through holes diametrically through the drums and secured therein by set screws 30. The beaters 30 have a short projection one side of the reel and a long projection on the other side of the reel or drum. The short projections are preferably about five inches and the long projections are preferably about eight inches. The object of the longer and short projections is to make a staggered relation of the beaters of each reel relative to the beaters of the adjacent reels. This arrangement has the advantage of not tearing the cotton into too small pieces and the further advantage of decreasing the power required to drive the reels. With the teeth or beaters 29 all the same length, the belt 24 would slip on the pulleys without driving the pulleys. The reels 9 and 10 will fairly distribute the cotton and the reel 11 with increased number of beaters will throw the cotton forward. The reel 12 with less beaters will tend to arrest the movement of the cotton and prevent the same from being thrown too fast on the discharge reel 13 which has an increased number of beaters to deliver the cotton to the conveyer belt 31. During operation, the dirt and trash pass upwardly and downwardly into the chambers 6 and 5, being carried by the air and delivered to the discharge chutes 32 and 33 which are united into a single discharge chute 34. The screen 3 passes under the mouth of the chute 33 and the mouth of the chute 32 is covered in part by the screen 2 and partly by an imperforate shield 35 which coöperates with the valves 36 carried by the conveyer belt 31, to prevent air from entering the carrier chamber 37 and interfering with the operation.

The conveyer belt 31 is driven by the pulley 38 which is rigid with shaft 19, and this conveyer runs over the idler 39 which is journaled in adjustable bearings 40 so that the tension of the conveyer may be regulated. The bearings 40 are carried by a frame having side bars 41 and a cross-bar 42. The shaft 43 passes through the bars 41. The frame 41 is adjusted by a screw shaft 44 which is journaled in the cross-bar 42 and operates through a nut 45 which is rigid with the cross-bar 46. The cross-bar 46 is mortised into the uprights 47 which are rigid with the cotton discharge chamber 48 and the conveyer chamber 37. The shaft 44 is driven by the bevel gear wheel 49 which is rigid therewith and by the bevel gear wheel 50 which is rigid with the shaft 50 which is journaled in the bars 41. The shaft 50 is provided with a crank 52 and bearings 53. The frame pieces 41 are guided by the blocks 54 which are rigid with uprights 47 and 55. The conveyer belt 31 can be tightened by turning the crank 52. The cleaned cotton is discharged through a hood 55. The upper part of the chamber 48 consists of a float 56 which is hingedly connected to the chute 33. The float will rest on the valves 36 so that the air cannot pass backwardly into the chamber 48.

It is preferable to provide hinged doors 57 for the chamber 6 so the chamber can be opened for adjustment of the reels and to make the interior of the chamber accessible. The doors 57 are hinged to the top of the chamber, the doors forming parts of the top and sides of the chamber and the side portions extending below the screen 3 and the screen 3 being made in sections and some of the sections attached to the door sections 57, and the other sections attached to the body of the chamber 6.

Means are provided for automatically stopping the feeding of cotton to the machine without stopping the running of the machine. If the cotton is being cleaned faster than it is taken from the machine, it is desirable to stop the feeding until the supply of cleaned cotton is removed so that the cotton will not fall to the floor or ground, and it is best to stop the cleaning without stopping the running of the machine so that the machine is ready to commence cleaning the cotton at the moment the cleaned cotton is removed, as the feeding of the cotton will be automatically resumed. The discharge chute 34 is provided with a valve 58 which is hingedly connected to the chute by a rocker shaft 59 and bearings 60. The valve 58 is provided with a handle 61. A receptacle 62 is provided to receive the cleaned cotton. This receptacle is supported on upright rods 63 which may be screwed into a rigid base 64. The receptacle 62 is connected to the rods 63 by cuffs which slide vertically on the rods. As the cleaned cotton is discharged into the box 62, it may be taken out by any convenient cotton elevator chute in the ordinary manner. The box 62 is suspended by means of weights 66 which are connected to ropes or cords 67. The cords 67 are attached to the weights 66 and run over pulleys 68 which are journaled in the upper ends of the rods or posts 63 and then run down to the box 62 and attached to any convenient parts thereof. Normally the weights 63 will hold the box or receptacle 62 in operative position to receive the cotton when discharged from the hood 55. The valve 58 stands normally open. A cord 69 is attached to the handle 61 and run over idlers 70 and attached to the box 62. If an excess of cleaned cotton is discharged into the box 62, the box will be weighted and move downwardly. This will pull on the cord 69 and this will close the chute 34 so that the suction fan which is drawing air through the machine will be cut off and no air can pass through the machine. The feeding of cotton through the chute 8 will be stopped instantly. This is true because the machine is complete in itself and is automatic in action. The greater part of the valve 58 is below the center of the hinge or shaft 59. When the cotton is removed from the box 62, the weights 63 will draw the box 62 back up to normal position. This will release the pull on the valve 58. The suction fan, pulling on the longer part of the valve 58, will immediately close the valve and open the chute 34 and thus start the feeding of cotton through the chute 8 instantly. Any suitable fan 71 may be put in communication with the chute 34 to be driven by a pulley 72.

Various changes may be made in the construction of the various parts without departing from my invention.

What I claim, is,—

1. A cotton cleaner comprising a chamber, screens dividing said chamber into compartments, forming a central compartment for the passage of cotton and compartments above and below the cotton compartment for the passage of trash and dirt, a series of revolving reels in said cotton compartment journaled in said chamber and provided with long and short beaters for agitating the cotton as the cotton passes therethrough, and means for creating suction through all of said compartments.

2. A cotton cleaner comprising a chamber, screens dividing said chamber into compartments, forming a central compartment for the passage of cotton and compartments above and below the cotton compartment for the passage of trash and dirt, a series of reels having long and short beaters in said cotton compartment provided with shafts journaled in said chamber, means for creating suction through all of said compartments, and means for driving said reels for agitating the cotton passing through said cotton chamber.

3. A cotton cleaner comprising a chamber, screens dividing said chamber into a passage for cotton and passages for the trash and dirt, means for creating suction through said passages, a series of reels in said cotton passage journaled in said chamber, each reel being provided with long and short beaters arranged in staggered relation, and means driving said reels.

4. A cotton cleaner comprising a chamber, screens dividing said chamber into a cotton compartment and compartments for the passage of trash and dirt, means for creating drafts through said compartments, a series of reels in said cotton compartment, each having long and short beaters and the reels having different numbers of beaters arranged in staggered relation, and means for driving said reels.

5. A cotton cleaner comprising a chamber, screens dividing said chamber into a cotton compartment and compartments for the passage of trash and dirt, a series of reels in said cotton compartment journaled in said chamber and provided with long and short beaters, means for driving said reels in unison for agitating the cotton, suction chutes connected with said chamber for carrying away trash and dirt, and a chamber for receiving and discharging the cleaned cotton.

6. A cotton cleaner comprising a chamber, screens dividing said chamber into a cotton compartment and compartments for the passage of trash and dirt, a series of reels in said cotton compartment, each reel having long and short beaters arranged in staggered relation, means for driving said reels, a suction chute in communication with all of said compartments, a cotton discharge chamber, and means in said chamber for taking the cotton from said cotton compartment and discharging the same from the machine.

7. A cotton cleaner comprising a chamber, screens dividing said chamber into a cotton compartment and compartments for the passage of trash and dirt, a series of revolving reels provided with long and short beaters in said cotton compartment for separating the trash and dirt from the cotton, a divided suction chute connected with all of said compartments, a cotton discharge chamber, a traveling conveyer in said discharge chamber and valves carried by said conveyer for closing the same against the passage of air and for receiving the cleaned cotton from said cotton compartment and discharging the same, and means for creating suction through said compartments and through said suction chute.

8. A cotton cleaner comprising a chamber, means for dividing said chamber into a cotton compartment and into compartments on each side of the cotton compartment for the passage of trash and dirt, means in said cotton compartment for separating the trash and dirt from the cotton, a discharge chamber in communication with said cotton compartment, means in said chamber for closing the same against the passage of air and for receiving the cleaned cotton from said cotton compartment and discharging the same, a suction chute having branches communicating with said compartments for carrying away trash and dirt, a valve for said suction chute, a cotton receiving receptacle for receiving the cleaned cotton, and means operatively connected with valve and with said cotton receiving receptacle for automatically stopping and starting the feeding of cotton to said cotton compartment.

In testimony whereof, I set my hand this 30th day of October, 1915.

THOMAS M. CASS.

Copies of this patent may be obtained for five cents each, by addressing the "Commissioner of Patents, Washington, D. C."